March 21, 1933.  H. J. KERR  1,901,912
STEAM DRUM BAFFLE
Filed Aug. 23, 1928   8 Sheets-Sheet 1

INVENTOR
Howard J. Kerr
BY
Gifford & Scull
ATTORNEYS

March 21, 1933.  H. J. KERR  1,901,912
STEAM DRUM BAFFLE
Filed Aug. 23, 1928  8 Sheets-Sheet 4

INVENTOR
Howard J. Kerr
BY
Gifford & Scull
ATTORNEYS

March 21, 1933. H. J. KERR 1,901,912
STEAM DRUM BAFFLE
Filed Aug. 23, 1928 8 Sheets-Sheet 7

March 21, 1933. H. J. KERR 1,901,912
STEAM DRUM BAFFLE
Filed Aug. 23, 1928  8 Sheets-Sheet 8

INVENTOR
Howard J. Kerr
BY
Gifford & Scull
ATTORNEYS

Patented Mar. 21, 1933

1,901,912

UNITED STATES PATENT OFFICE

HOWARD J. KERR, OF WESTFIELD, NEW JERSEY, ASSIGNOR TO THE BABCOCK & WILCOX COMPANY, OF BAYONNE, NEW JERSEY, A CORPORATION OF NEW JERSEY

STEAM DRUM BAFFLE

Application filed August 23, 1928. Serial No. 301,456.

This invention relates to baffles for steam and water drums but is not restricted to this particular use. The invention will be understood from the description in connection with the accompanying drawings, in which.

In all the figures of the drawings reference character 1 indicates a steam and water drum of a boiler into which rows of circulating tubes 2 enter for introducing a mixture of steam and water.

Figure 1:
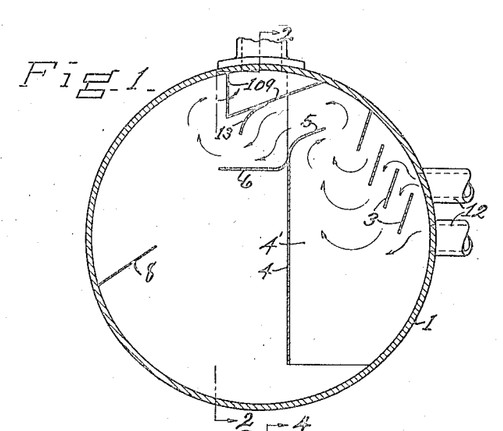
Fig. 1 is a vertical section through an illustrative embodiment of the invention taken along the line 1—1 of Fig. 2.
Figure 2:
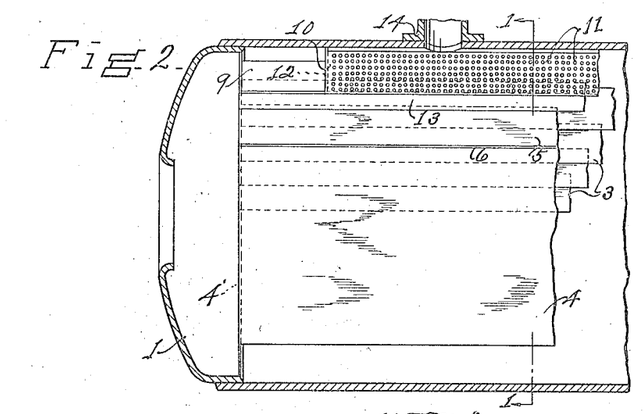
Fig. 2 is a longitudinal section partly broken away, taken along the line 2—2 of Fig. 1.

In the embodiment shown in Figs. 1 and 2 a shutter baffle 3 is provided near the inlet end of the tubes 2 comprising spaced parallel inclined plates 3, the uppermost one of which has its upper edge in contact with the wall of the drum to prevent steam and water from passing upwardly along the inside wall of the drum. A vertically disposed baffle 4 is located on the other side of the plates 3 from the tubes 2 and extends both above and below the normal water level in the drum. The space between the ends of the baffle 4 and the inside wall of the drum is closed by the end plates 4' to prevent steam from passing around the ends of the baffle 4. The upper edge of the baffle 4 is curved inwardly as indicated at 5 toward the plates 3 and a horizontal baffle 6 extends from baffle 4 near the upper edge and is located on the other side from the tubes 2. A swash plate 8 is located on the other side of the drum from the tubes 2 and extends from a line on the drum below the normal water level from substantially one end of the drum to the other to aid in keeping the water in the drum quiet.

A dry pan is located above the horizontal baffle 6 and comprises an inclined bottom plate 9, one edge of which contacts with the inside wall of the drum and the other edge of which is connected to the lower edge of the side wall 10 of the dry pan. The wall 10 is perforated with numerous holes as indicated at 11. The ends of the pan are closed by end plates 12. A curved baffle or drip plate 13, concave on its lower side, extends from the inclined bottom 9 downwardly toward the horizontal baffle 6, thus leaving a space for the steam to pass through. The baffle plates and other members inside of the drum are retained in fixed positions by means of brackets (not shown) or in any other well known or convenient manner.

The operation of the embodiment illustrated in Fig. 1 is as follows: The mixture of steam and water enters a compartment having a side wall 4 and end walls 4′ extending below the normal water level in the drum 1. The compartment has an opening at the top. The mixture of steam and water enters through the rows of tubes 2 and strikes the shutter baffle or inclined plates 3, and due to the change in velocity and direction the main portion of the water is separated out and collects in the lower portion of the drum 1. The steam, and whatever water may remain mixed therewith, pass approximately in the direction of the arrows and is changed suddenly in direction by means of the curved edge 5, and again reverses, passing between the plates 6 and 9 where the drip plate 13 aids in separating out moisture that may be in the steam even though it might be in the form of very finely divided spray. The drip plate 13 allows the fine particles to collect in drops heavy enough to fall through the moving stream. The dry steam then passes through the perforations 11 into the dry pan and thence out through the steam outlets 14. As will be clear from Fig. 2, which illustrates one end of the device, the plates 3, 4, 5, 6, 13 and 9 extend substantially from one end of the steam and water drum 1 to the other. It will also be clear that the steam passes from the inlet tubes 2 to the dry pan at all times in directions substantially at right angles to the length of the drum. The dry pan is shallow so that a considerable distance is left between the bottom of the dry pan and the water level in the drum, thus providing space for the transverse passage of the steam without causing the steam to disturb the surface of the water seriously or carry moisture from the surface to the dry pan.

Figure 3:
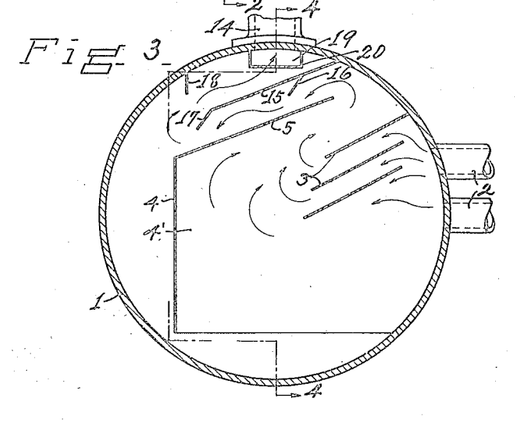
Fig. 3 is a section similar to Fig. 1 taken along the line 3—3 of Fig. 4 showing a modification.
Figure 4:
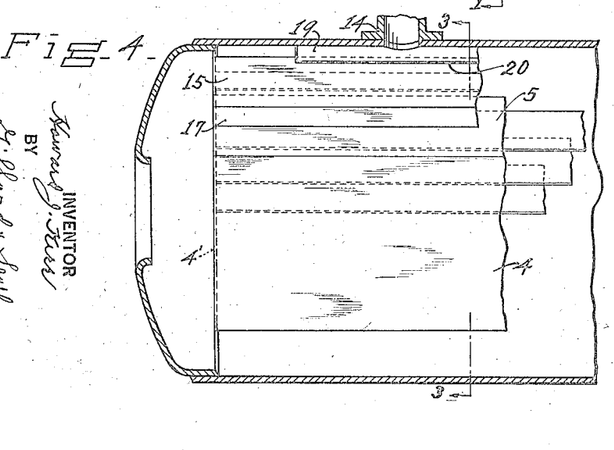
Fig. 4 is a section similar to Fig. 2 taken along the line 4—4 of Fig. 3.

In the modification shown in Figs. 3 and 4, the shutter baffles 3 are wider and less steeply inclined than in Fig. 1. In this figure the vertical plate 4 is located on the other side of the center line from the tubes 2. Also, in this modification, the plate 5 at the upper edge of the plate 4 is much wider than that shown in Fig. 1 and is approximately parallel to the plates 3.

The baffle plate 15 is approximately parallel to the plate 5 and its upper edge contacts with the inside of the drum. It is provided with a drip plate 16 and its lower edge is bent downwardly at 17 to serve also as a drip plate. A vertical baffle 18 extends from the drum a short distance downwardly in a plane slightly offset from the lower edge of the plate 15. The dry pan 19 is of the box type and its bottom 20 is provided with perforations for the dry steam to enter. It will be obvious that in this modification the steam will be reversed in direction several times during its passage from the tubes 2 to the dry pan and the water will be well separated from the steam. In this modification the plates 3 are shown as being more nearly horizontal than the corresponding plates 3 shown in Fig. 1. The plates are made inclined so as to cause a change in the direction of the entering mixture of steam and water for separating out the water but the plates are given a minimum inclination to avoid the danger of causing the steam to impinge violently against the surface of the water in the drum and disturb it.

Figures 5, 7:
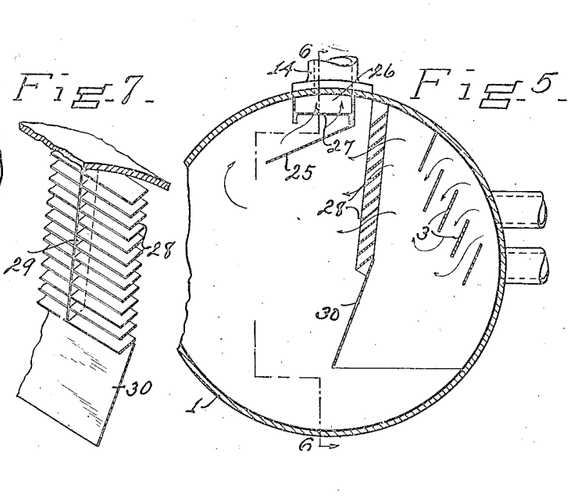
Fig. 5 is a section similar to Fig. 1 taken along the line 5—5 of Fig. 6 showing another modification.
Fig. 7 is a perspective view showing some of the details of Fig. 5.
Figure 6:
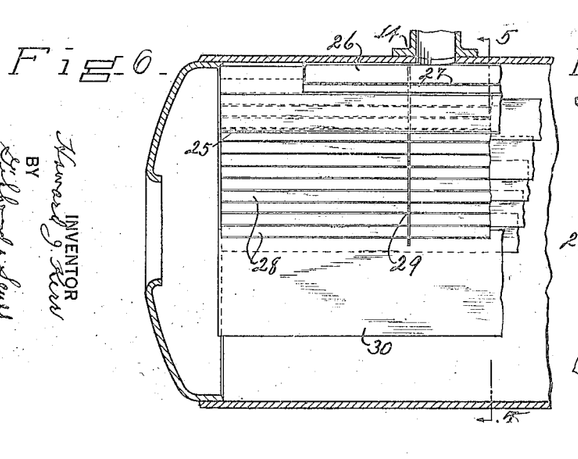
Fig. 6 is a section similar to Fig. 2 taken along the line 6—6 of Fig. 5.

In the modification shown in Figs. 5, 6, and 7 a series of spaced, inclined, narrow plates 28 extends from near the top of the drum 1 downwardly, these plates being located on the other side of the plates 3 from the tubes 2. The plates 28 are connected by strips 29 and the steam passes in a downwardly inclined direction, as indicated by the arrows, as it passes between the plates 28. A plate 30 extends from the lowest one of the plates 28 to a position a considerable distance below the normal water level in the drum. An inclined baffle 25 is located on the other side of the plates 21 from the tubes 2 in such a position that the steam is caused to pass around the lower edge thereof before it passes into the box type dry pan 26 through the perforated bottom 27 thereof.

Figure 8:
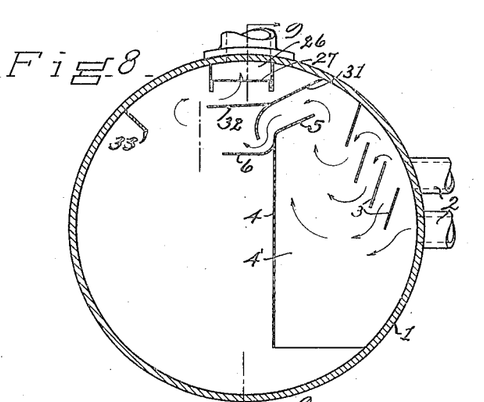
Fig. 8 is a section similar to Fig. 1 taken along the line 8—8 of Fig. 9 showing another modification.
Figure 9:
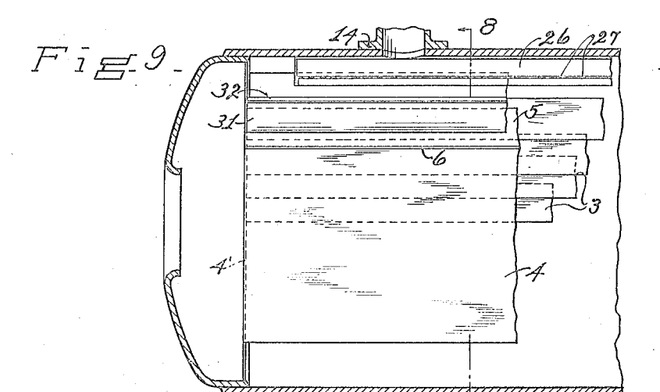
Fig. 9 is a section similar to Fig. 2 taken along the line 9—9 of Fig. 10.

In the modification shown in Figs. 8 and 9 the parts 3, 4, 4′, 5 and 6 are similar to those already described. The baffle 31 extends from the wall of the drum 1 along a line approximately above the upper edge of the extension 5 in a downwardly inclined direction and its lower edge is curved and terminates a short distance above the horizontal baffle 6. A horizontal baffle 32 extends over the baffle 31 below the dry pan 26 which is similar to that described in connection with Fig. 5. A baffle 33 projects radially from the wall of the steam and water drum on the other side from the tubes 2 above the normal water level and prevents any particles of liquid from being swept along the inside wall of the drum to the dry pan.

Figure 10:
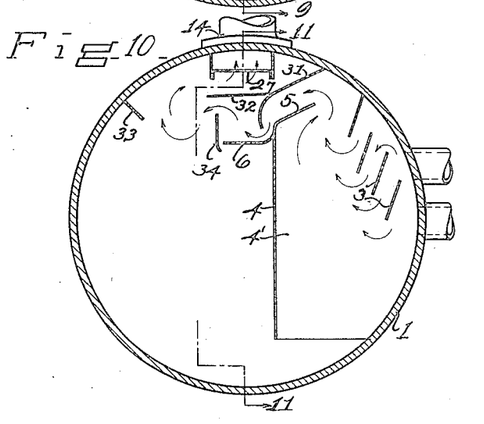
Fig. 10 is a section similar to Fig. 1 taken along the line 10—10 of Fig. 11 showing another modification.
Figure 11:
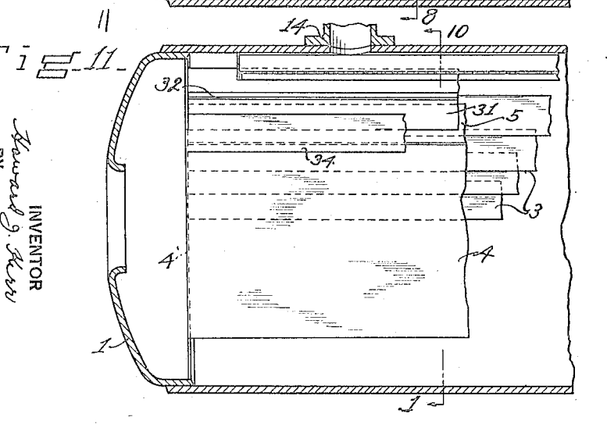
Fig. 11 is a section similar to Fig. 2 taken along the line 11—11 of Fig. 10.

The modification shown in Figs. 10 and 11 is similar to that shown in Figs. 8 and 9 but differs therefrom mainly in that a vertical baffle 34 is provided near the edge of the horizontal baffle 6 and is spaced a slight distance therefrom, for the purpose of catching some of the entrained water and permitting it to pass downwardly into the lower portion of the steam and water drum. This vertical baffle 34 also gives an addition change in direction for the steam and the water caught on this baffle passes into the water space of the drum clear of the steam flow.

Figure 12:
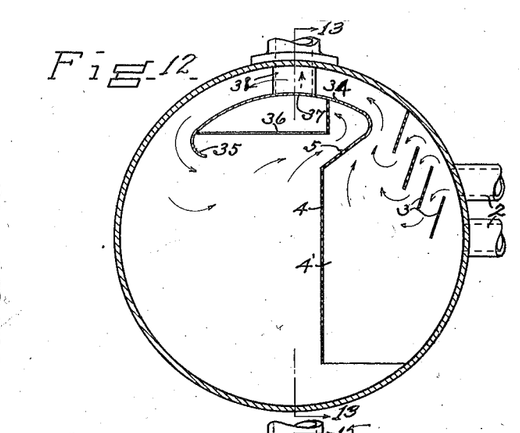
Fig. 12 is a section similar to Fig. 1 taken along the line 12—12 of Fig. 13 showing another modification.
Figure 13:
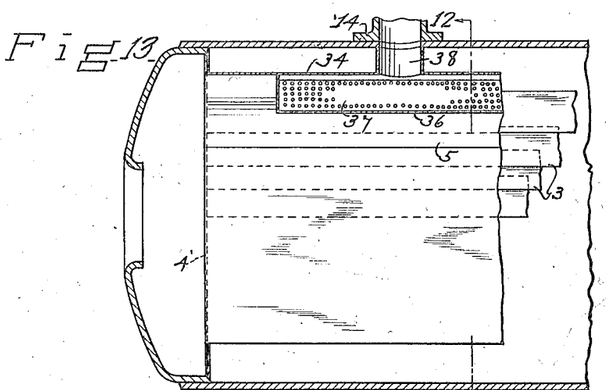
Fig. 13 is a section similar to Fig. 2 taken along the line 13—13 of Fig. 12.

In the modification shown in Figs. 12 and 13 the extension plate 5 is curved around as shown at 34 so as to be approximately parallel to the upper wall of the drum 1 and its lower edge is curved inwardly as indicated at 35. The dry pan comprises a horizontal imperforate bottom that extends from near the edge of the curved plate 34 and is attached to the vertical side 37 that is perforated for the admission of the dry steam. Nipples 38 extend from the dry pan through the curved plate 34 to the outlets 14 for the steam.

In this modification the steam, after striking the plates 3 and having most of the water separated therefrom, passes through the space between the plate 34 and the upper portion of the drum, thence around the edge 35 as indicated by the arrows through the perforated wall 37 into the dry pan and thence into the steam outlets. The water is separated from the steam while passing around the plate 34 by centrifugal force, the water being thrown outwardly onto the drum sheet along which it passes downwardly. The steam itself passes through the perforations in the plate 37.

Figure 14:
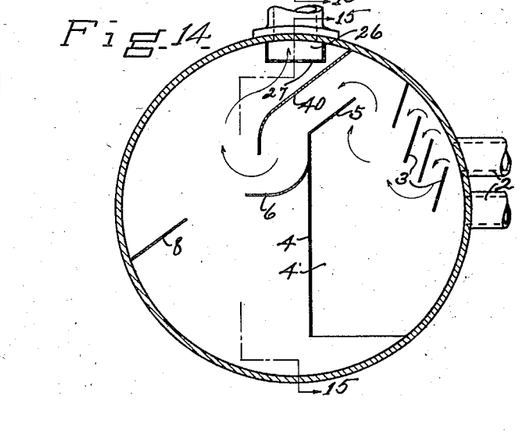
Fig. 14 is a section similar to Fig. 1 taken along the line 14—14 of Fig. 15 showing another modification.
Figure 15:
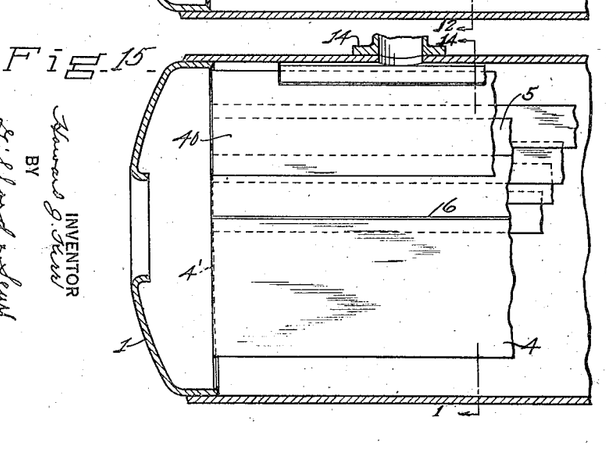
Fig. 15 is a section similar to Fig. 2 taken along the line 15—15 of Fig. 14.

In the modification shown in Figs. 14 and 15 the parts 3, 4, 4', and 5 are similar to those already described. In this modification the baffle 6 has its edge next to the plate 4 curved to a greater radius and the main portion of this baffle is located lower in the drum than is the case in Figs. 8 and 10, for example. In this modification the inclined baffle 40 that corresponds somewhat to the baffle 31 in Figs. 8 and 10 also extends farther downwardly into the drum, thus causing the steam to travel downwardly over a longer path before it enters the dry pan.

Figure 16:
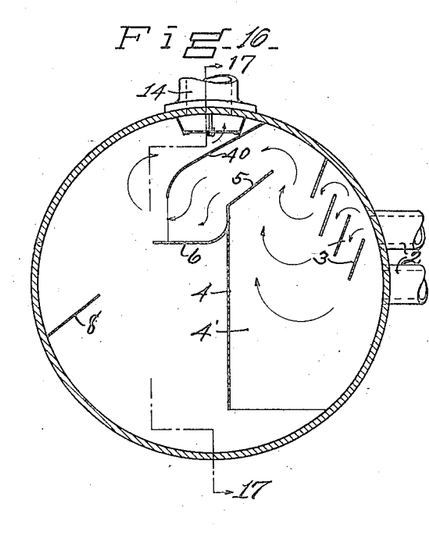
Fig. 16 is a section similar to Fig. 1 taken along the line 16—16 of Fig. 17 showing a modification.
Figure 17:
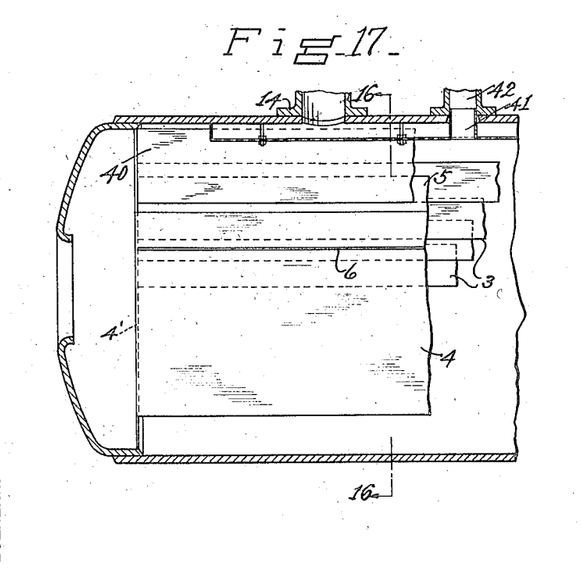
Fig. 17 is a section similar to Fig. 2 taken along the line 17—17 of Fig. 16.

The modification shown in Figs. 16 and 17 differs mainly from that shown in Figs. 14 and 15 in that the horizontal baffle 6 is located at a higher point and the inclined baffle 40 does not extend so far downwardly, thus giving more clearance between the horizontal plate 6 and the water level in the drum. Also, in this modification, the dry pan is somewhat different and nipples 41 are shown and extend through the dry pan to the safety valve outlets 42 so that when the safety valves open the waste steam will not have to pass through the dry pans. This feature may also be used in connection with the other illustrative embodiments of the invention.

Figure 18:
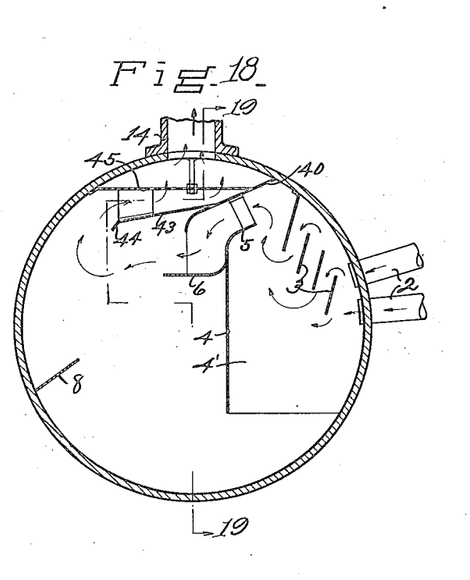
Fig. 18 is a section similar to Fig. 1 taken along the line 18—18 of Fig. 19 showing another modification.
Figure 19:
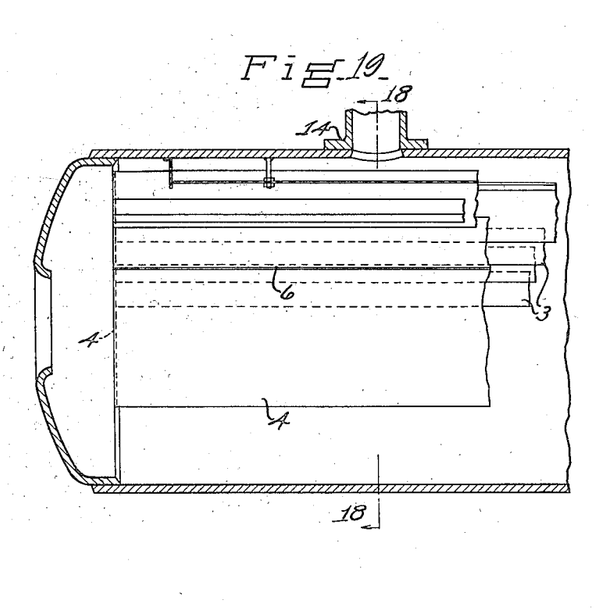
Fig. 19 is a section similar to Fig. 2 taken along the line 19—19 of Fig. 18.

In the modification shown in Figs. 18 and 19, the parts 3, 4, 4', 5 and 6 are similar to those already described. In this modification the inclined plate 40 is more nearly horizontal and a slightly inclined baffle plate 43 extends from this plate and terminates in a downwardly bent lip or drip 44 around which the steam passes on its way to the dry pan. The bottom 45 of the dry pan extends from the drum on one side to the plate 40 on the other side. Perforations 45' in this plate are preferably arranged toward the edge that is remote from the free edge of plate 43 around which the steam passes.

Figure 20:
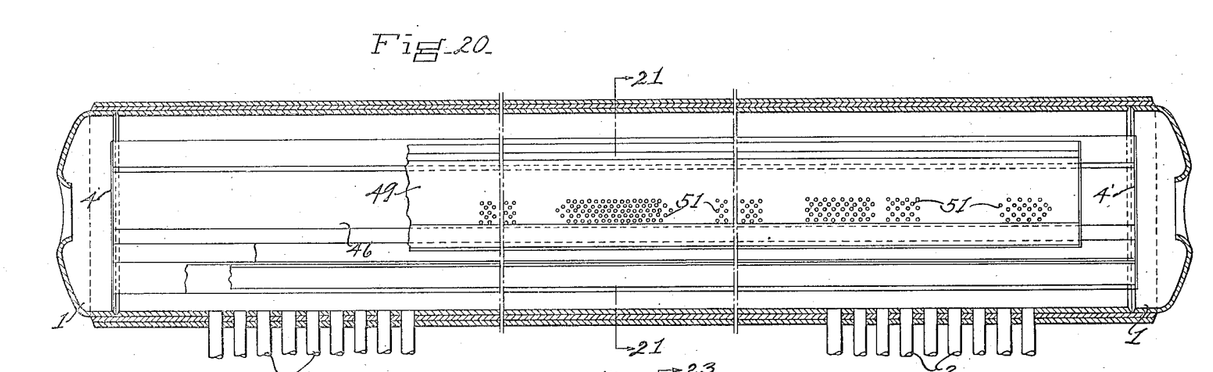
Fig. 20 is a longitudinal section through another modification of the invention taken along the line 20—20 of Fig. 21.
Figure 21:
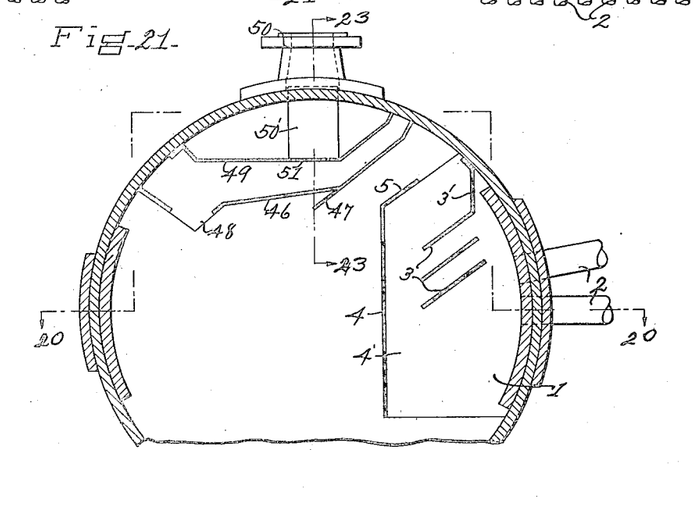
Fig. 21 is a section along the line 21—21 of Fig. 20.
Figure 22:
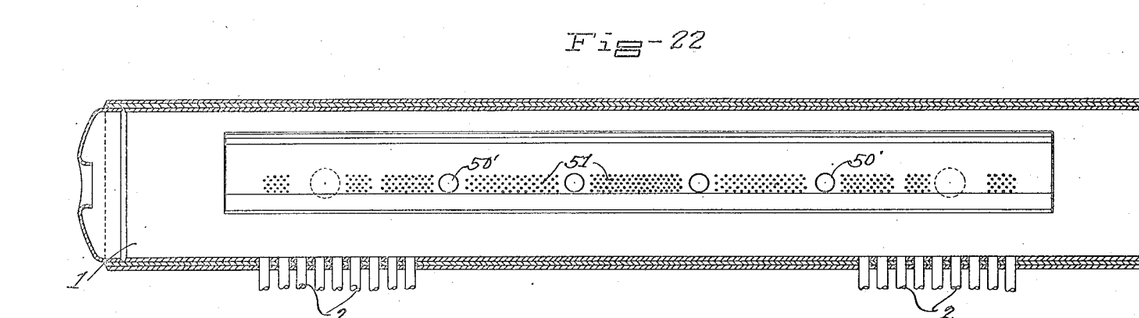
Fig. 22 is a longitudinal section viewed from below.
Figure 23:
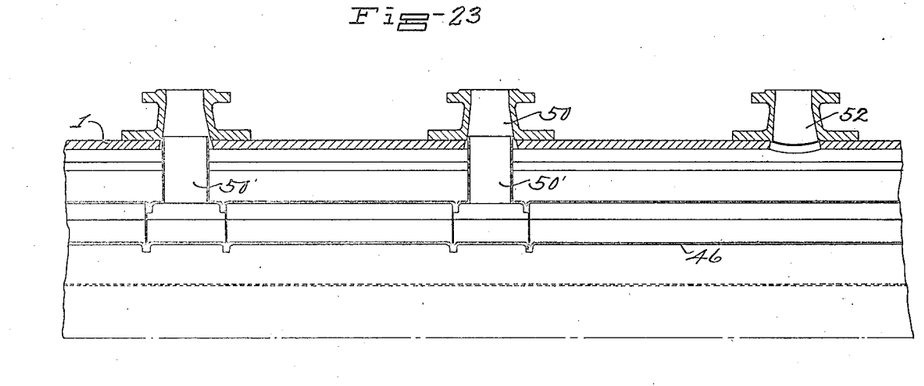
Fig. 23 is a section along the line 23—23 of Fig. 21.

In the modification shown in Figs. 20 and 23, the upper portion of the uppermost plate 3 is vertically disposed as shown at 3''. A dry pan baffle 46 is located in the steam space of the steam and water drum and extends across the drum from a point above the upper edge of plate 4 and its extension 5, and is provided with an inclined drip ledge 47 and also with an opening 48 near the side of the drum opposite the tubes 2. The baffle 46 is so constructed that the edges on opposite sides of the opening 48 are inclined downwardly generally opposite to the direction of flow of steam through the opening 48. The dry pan 49 is located above the baffle 46 and is spaced a short distance therefrom. Safety valve outlets 50 are provided at the top of the steam and water drum 1 and nipples 50' extend from these outlets 50 through holes in the dry pan 49. The bottom of the dry pan 49 is provided with rows of holes or openings 51 that may be arranged in groups between the openings for the nipples 50'. Steam outlets 52 are provided some distance apart and the openings 51, preferably of uniform size, are less numerous and farther apart near the outlets 52 than they are at farther distances therefrom.

I claim:

1. A baffle for a steam and water drum comprising shutter plates and means comprising a plate extending above and below the normal water level in said drum to change the direction of travel of steam after it leaves said plates and before it leaves said drum, said last named plate having its upper edge inclined towards the steam inlet to said drum.

2. In a steam and water drum, a plurality of spaced inclined plates near the steam inlet to said drum, and a vertically disposed plate on the other side of said plates from the steam inlet, the upper edge of said plate extending towards the steam inlet.

3. A steam and water drum, a plurality of spaced inclined plates near the steam inlet to said drum, a vertically disposed plate on the other side of said plates from the steam inlet, the upper edge of said plate extending towards the steam inlet, and a horizontally disposed baffle on the other side of said plate.

4. In a steam and water drum, a plurality of spaced inclined plates near the steam inlet to said drum, a vertically disposed plate on the other side of said plates from the steam inlet, a baffle above the upper edge of said plate and a drip ledge on said baffle.

5. In a steam and water drum, a plurality of spaced inclined plates above the normal water level in said drum near the steam inlet to said drum, a vertically disposed plate on the other side of said plates from the steam inlet, a baffle above the upper edge of said plate and a steam outlet above said last named baffle.

6. In a steam and water drum, a plurality of spaced inclined plates near the steam inlet to said drum, a vertically disposed plate on the other side of said plates from the steam inlet, and an extension from the upper edge of said plate substantially as long as said plate and having a portion thereof approximately parallel to the upper part of said drum.

7. In a steam and water drum, a plurality of spaced inclined plates near the steam inlet to said drum, a vertically disposed plate on the other side of said plates from the steam inlet, an extension from the upper edge of said plate substantially as long as said plate and having a portion thereof approximately parallel to the upper part of said drum, and a steam outlet from the space below said extension portion.

8. In a steam and water drum, a plurality of spaced inclined plates near the steam inlet to said drum, a vertically disposed plate on the other side of said plates from the steam inlet, the upper edge of said plate extending towards the steam inlet, a horizontally disposed baffle on the other side of said plate and a vertically disposed baffle near the edge of said horizontally disposed baffle.

9. A baffle for a steam and water drum comprising a plurality of substantially flat inclined plates above the normal water level in said drum, a dry pan, a baffle below said dry pan, and a vertically disposed plate extending some distance on opposite sides of the normal water level in said drum located between said inclined plates and said baffle.

10. In a steam and water drum having an inlet and outlet, a plurality of spaced inclined plates forming steam passages near the steam inlet to said drum, another inclined plate on the other side of said plates from the steam inlet, the upper edge of said last named plate extending towards the steam inlet, and the said last named plate being located adjacent the steam outlet in position to cause the steam passing through the spaced plates to move around the lower edge of said last named plate before reaching the steam outlet.

11. In a steam and water drum, a horizontally disposed dry plate in the upper portion of said drum and having openings therethrough, a safety valve connection above said plate and a nipple extending from said connection through said plate.

HOWARD J. KERR.